(12) United States Patent
Handley

(10) Patent No.: US 7,539,653 B2
(45) Date of Patent: May 26, 2009

(54) DOCUMENT CLUSTERING

(75) Inventor: John C. Handley, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 692 days.

(21) Appl. No.: 11/246,336

(22) Filed: Oct. 7, 2005

(65) Prior Publication Data

US 2007/0083368 A1      Apr. 12, 2007

(51) Int. Cl.
G06E 1/00      (2006.01)
G06E 3/00      (2006.01)
G06G 7/00      (2006.01)

(52) U.S. Cl. ...................................... 706/17
(58) Field of Classification Search ................ None
See application file for complete search history.

(56) References Cited

U.S. PATENT DOCUMENTS

| | | | |
|---|---|---|---|
| 5,442,778 A | | 8/1995 | Pedersen et al. |
| 6,611,825 B1* | | 8/2003 | Billheimer et al. ............ 706/45 |
| 6,751,621 B1* | | 6/2004 | Calistri-Yeh et al. ........ 707/100 |
| 7,096,206 B2* | | 8/2006 | Hitt .............................. 706/12 |
| 7,200,592 B2* | | 4/2007 | Goodwin et al. ............... 707/6 |
| 7,240,038 B2* | | 7/2007 | Hitt .............................. 706/12 |
| 7,249,117 B2* | | 7/2007 | Estes ........................... 706/52 |
| 7,328,216 B2* | | 2/2008 | Hofmann et al. ............ 707/100 |
| 7,403,932 B2* | | 7/2008 | Kao et al. .................... 706/45 |
| 7,406,456 B2* | | 7/2008 | Calistri-Yeh et al. .......... 706/55 |
| 7,451,124 B2* | | 11/2008 | Handley ..................... 706/45 |
| 7,499,891 B2* | | 3/2009 | Hitt .............................. 706/12 |
| 7,502,765 B2* | | 3/2009 | Kummamuru et al. ........ 706/15 |

OTHER PUBLICATIONS

A Document Clustering Method Based on One-Dimensional Som Yan Yu; Pilian He; Yushan Bai; Zhenlei Yang; Computer and Information Science, 2008. ICIS 08. Seventh IEEE/ACIS International Conference on May 14-16, 2008 pp. 295-300 Digital Object Identifier 10.1109/ICIS.2008.109.*
Feature Space Transformations in Document Clustering Csorba, K.; Vajk, I.; Intelligent Engineering Systems, 2006. INES '06. Proceedings. International Conference on 0-0 0 pp. 175-179 Digital Object Identifier 10.1109/INES.2006.1689364.*
Finding Hotspots in Document Collection Wei Peng; Ding, C.; Tao Li; Tong Sun; Tools with Artificial Intelligence, 2007. ICTAI 2007. 19th IEEE International Conference on vol. 1, Oct. 29-31, 2007 pp. 313-320 Digital Object Identifier 10.1109/ICTAI.2007.173.*
Simultaneous categorization of text documents and identification of cluster-dependent keywords Frigui, H.; Nasraoui, O.; Fuzzy Systems, 2002. FUZZ-IEEE'02. Proceedings of the 2002 IEEE International Conference on vol. 2, May 12-17, 2002 pp. 1108-1113 Digital Object Identifier 10.1109/FUZZ.2002.1006659.*
Kevin Beyer et al., "When Is 'Nearest Neighbor' Meaningful?", 10 pp.

* cited by examiner

*Primary Examiner*—Michael B Holmes
(74) *Attorney, Agent, or Firm*—Pepper Hamilton LLP

(57) ABSTRACT

Methods and systems for clustering document collections are disclosed. A system for clustering observations may include a processor and a processor-readable storage medium. The processor-readable storage medium may contain one or more programming instructions for performing a method of clustering observations. A plurality of parameter vectors and a plurality of observations may be received. A distribution may also be determined. An optimal partitioning of the observations may then be selected based on the distribution, the parameter vectors and a likelihood function.

18 Claims, 3 Drawing Sheets

DOCUMENT CLUSTERING

BACKGROUND

1. Technical Field

The disclosed embodiments generally relate to the field of database creation, ordering and management.

2. Description of the Related Art

Document collections can be modeled by using term-frequency vectors. A term-frequency vector is a vector having a plurality of entries each corresponding to a particular term that is present in one or more document collections. For a document collection, each entry is used to tally the number of occurrences of a term to which the entry corresponds in the document collection. A conventional method of generating document collections from a corpus is described in U.S. Pat. No. 5,442,778 to Pedersen et al., entitled "Scatter-Gather: A Cluster-Based Method and Apparatus for Browsing Large Document Collections," the disclosure of which is incorporated herein by reference in its entirety.

Term-frequency vectors have been viewed as vectors in a high-dimensional vector space. However, mathematical difficulties with clustering high-dimensional random vectors using distances have been exposed in K. S. Beyer, J. Goldstein, R. Ramakrishnan and U. Shaft: "When Is 'Nearest Neighbor' Meaningful?", Proceedings 7th International Conference on Database Theory (ICDT'99), pp 217-235, Jerusalem, Israel (1999). As a result, information-theoretic methods have been developed where the vectors are viewed as either empirical distributions (histograms) or outcomes of multinomial distributions.

What is needed is a method and system for grouping documents into collections such that documents that are contiguous in time and topic appear in the same cluster.

A need exists for a method and system for efficiently selecting an optimal partitioning of time-ordered document clusters.

A further need exists for a method and system for determining an optimal partitioning of time-ordered document clusters based on the number of parameters used to describe the partitions.

The present disclosure is directed to solving one or more of the above-listed problems.

SUMMARY

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "document" is a reference to one or more documents and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention.

Document collections may be modeled as term frequency vectors. The vectors may be further modeled as outcomes of multinomial distributions, Bernoulli distributions or other distribution functions. Two document collections with statistically indistinguishable distributions may be considered to have the same topics. Given a series of document collections, all possible partitions of the series may be considered. A penalized likelihood function, such as the Akaike's Information Criterion (AIC), may be calculated for each partition and may be used to rank the partitions.

In an embodiment, a system for clustering observations may include a processor, and a processor-readable storage medium. The processor-readable storage medium may contain one or more programming instructions for performing a method of clustering observations. The method may include receiving a plurality of parameter vectors, determining a distribution, receiving a plurality of observations, and selecting an optimal partitioning of the observations based on the distribution, the parameter vectors, and a likelihood function.

In an embodiment, selecting an optimal partitioning comprises one or more programming instructions for, for each possible partitioning of the observations, determining a maximum likelihood parameter vector for each segment and calculating a penalized likelihood value using the likelihood function based on at least a plurality of likelihoods, and selecting an optimal partitioning. The optimal partitioning may be the partitioning having the smallest penalized likelihood value. A penalized likelihood value may equal, for example, the sum of a negative number multiplied by the log likelihood and a positive value that increases with the number of parameters. Each partitioning may include one or more segments, and each segment may include one or more observations. The maximum likelihood parameter vector may be the parameter vector that maximizes the product of the distributions for each observation in the segment. Each likelihood may include the distribution for each observation with respect to the maximum likelihood parameter vector for the segment containing the observation.

In an alternate embodiment, selecting an optimal partitioning comprises one or more programming instructions for, for each possible segment of one or more observations, determining a maximum log likelihood value for the segment; for each possible number of segments ranging from one to the number of observations, inclusive: determining an optimal sub-partitioning from one or more partitionings having the number of segments, and calculating a penalized likelihood value using the likelihood function for the optimal sub-partitioning having the number of segments; and selecting an optimal partitioning. The maximum log likelihood value may include the largest sum of the logarithms of a distribution for each observation in the segment. The optimal sub-partitioning may include the partitioning having a largest value for a sum of one or more log likelihood values. Each log likelihood value may include the logarithm of the distribution of an observation with respect to a parameter vector for the segment containing the observation. The optimal partitioning may be the optimal sub-partitioning having the smallest penalized likelihood value.

In an embodiment, a method of clustering observations may include receiving a plurality of parameter vectors, determining a distribution, receiving a plurality of observations, and selecting an optimal partitioning of the observations based on the distribution, the parameter vectors, and a likelihood function.

BRIEF DESCRIPTION OF THE DRAWINGS

Aspects, features, benefits and advantages of the embodiments described herein will be apparent with regard to the following description, appended claims and accompanying drawings where:

DETAILED DESCRIPTION

A document collection may be a grouping of documents. A set of document collections may be considered to be "time-dependent" if each document collection contains documents pertaining to non-overlapping periods of time. For example, a set of document collections, where each document collection pertains to one or more service logs reported in a month associated with the particular document collection, may be considered time-dependent. Time-dependent document collections may be ordered from earliest to latest to produce a set of "time-ordered" document collections.

Clustering time-ordered document collections may be performed by determining a plurality of probabilities of term occurrences as expressed by, for example, a multinomial distribution. Accordingly, each document collection may be an observation of a distribution with unknown, but estimable, parameters. In an alternate embodiment, a Bernoulli distribution or some other distribution may be used to represent a document collection. Parameters may be estimated using a maximum likelihood algorithm. Assuming document collections are mutually statistically independent, the likelihood of a series of document collections may be the product of their individual likelihoods.

Figure 1A:
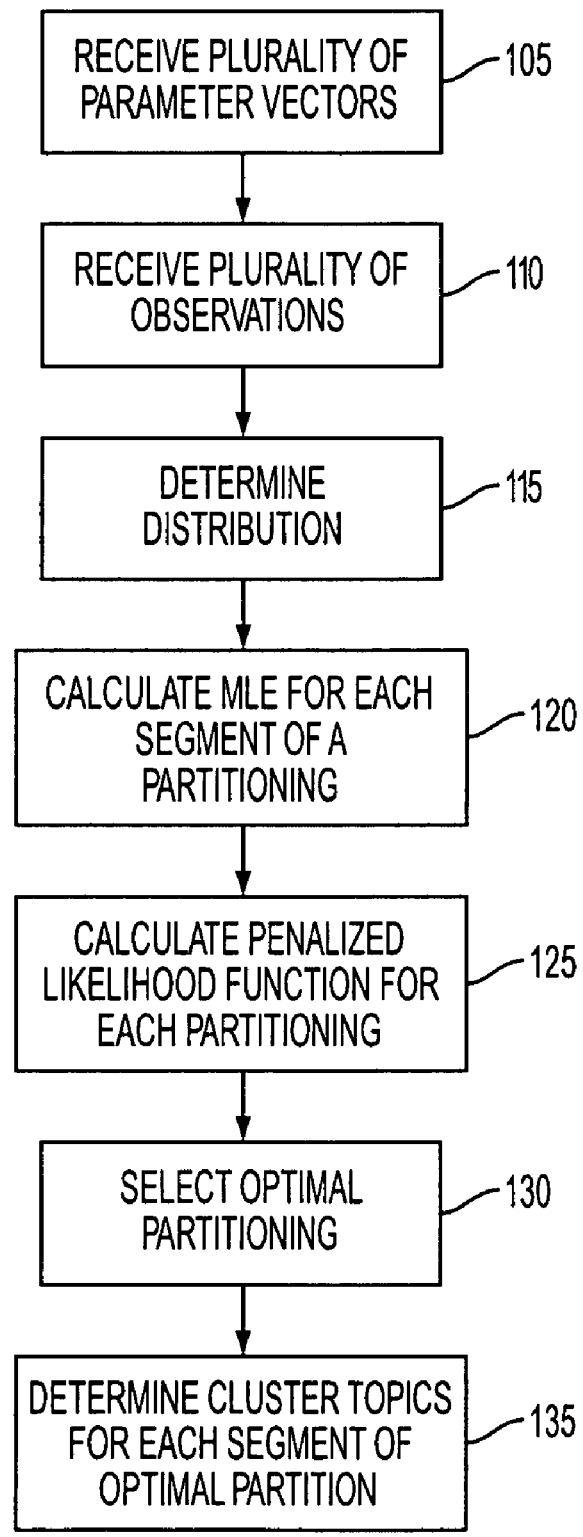
FIGS. 1A and 1B depict flow diagrams for exemplary processes for determining document clusters according to an embodiment.

FIG. 1A depicts a flow diagram for an exemplary process for determining document clusters according to an embodiment. A plurality of parameter vectors 105 and a plurality of observations 110 may each be obtained. Each parameter vector may include a plurality of parameters. In an embodiment, the observations may be received 110 in a time-ordered manner. Each observation may have been generated from, for example, a document cluster. A distribution may also be determined 115.

For example, an embodiment may include a distribution having n=5 different parameter vectors ($f(x; p_1), \ldots, f(x; p_5)$), where each $p_i$ is a parameter vector having K parameters. The embodiment may further include five independent vector observations ($x_1, \ldots, x_5$) occurring in a time-ordered manner. A maximum likelihood estimate of $p_i$ may be $$\hat{p}_i = \underset{p}{\mathrm{argmax}} f(x_i; p).$$

A penalized likelihood function, such as the Akaike's Information Criterion (AIC), may be computed for a single vector observation $x_i$. For example, AIC($p_i; x_i$)=−2 log $f(x_i; \hat{p}_i)$+2K. This may be considered to be the log likelihood penalized by the number of estimable parameters.

In an embodiment, a penalized likelihood function may include multiplying a log likelihood by a negative number and adding a positive penalty to the result. In such embodiments, a best model may be the model having the smallest value for the penalized likelihood function when maximum likelihood estimates are used for parameter values. Penalized likelihood functions, other than AIC, may include Bayesian Information Criterion, Minimum Description Length, and versions of AIC that correct for small sample sizes or deviations from the assumptions of the underlying probability model $f$. As used herein, a penalized likelihood function may include a function of the log of the likelihood function with any negative number multiplied by the log likelihood plus a positive term that increases with the number of parameters.

The $2^{N-1}$ possible partitionings (i.e., 16 possible partitionings for 5 distributions) may then be considered for the data. To show that $2^{N-1}$ possible partitionings exist, the following ordering of the indices and the combination of possible dividers may be considered: [1 $d_1$ 2 $d_2$ 3 $d_3 \ldots d_{N-1}$ N], where $d_i$=1 if a divider or partition exists between i and i−1, and $d_i$=0 otherwise. This ordering may be used to enumerate all possible ordered partitions of N ordered items. Accordingly, it may be easily shown that $2^{N-1}$ binary vectors ($d_1, \ldots, d_{N-1}$), and hence $2^{N-1}$ possible partitionings, exist.

After receiving the parameter vectors, observations, and distribution, an optimal partitioning may be determined using a penalized likelihood function. In an embodiment, the maximum likelihood estimate for each segment of a partitioning may be calculated 120. A penalized likelihood function for each partitioning may then be calculated 125 based on the maximum likelihood estimate for each segment of the partitioning. The partitioning having the minimum value for its penalized likelihood function may be selected 130 as the optimal partition. The operation of these steps is described in further detail below with respect to two exemplary partitionings.

For example, a first partitioning may assume that all parameters have the same value (i.e., $p_1 = \ldots = p_5 \equiv P_{[12345]}$). The maximum likelihood parameter for the first partitioning may be calculated by $$\hat{p}_{[12345]} = \underset{p}{\mathrm{argmax}} f(x_1; p) f(x_2; p) f(x_3; p) f(x_4; p) f(x_5; p).$$

Accordingly, the AIC for this partitioning may be calculated by $$AIC([12345]; x_1, \ldots, x_5) = -2 \sum_{i=1}^{5} \log f(x_i; \hat{p}_{[12345]}) + 2K.$$

Only K estimable parameters may be used since each distribution has the same parameter vector of K parameters (i.e., $P_{[12345]}$).

A second partitioning [12][345] may have the following parameter relationships: $P_1=P_2 \equiv P_{[12]}$ and $p_3=p_4=p_5 \equiv_{[345]}$. The corresponding maximum likelihood parameters for the second partitioning may be calculated by $$\hat{p}_{[12]} = \underset{p}{\mathrm{argmax}} f(x_1; p) f(x_2; p) \text{ and } \hat{p}_{[345]} =$$

$$\underset{p}{\mathrm{argmax}} f(x_3; p) f(x_4; p) f(x_5; p).$$

The AIC for the second partitioning may be calculated by $$AIC([12][345];$$
$$x_1, \ldots, x_5) = -2\left[\sum_{i=1}^{5} \log f(x_i; \hat{p}_{[12]}) + \sum_{i=3}^{5} \log f(x_i; \hat{p}_{[345]})\right] + 2(2)K.$$

Here, 2K estimable parameters may be required because the distributions each have one of two parameter vectors each having K parameters (i.e., $P_{[12]}$ and $P_{[345]}$).

The maximum likelihood parameters and AICs may be computed for each of the following 16 time-ordered partitions of [12345]:
Partitions having 1 segment: [12345];
Partitions having 2 segments: [1234][5], [123][45], [12][345], and [1][2345];
Partitions having 3 segments: [123][4][5], [12][34][5], [12][3][45], [1][234][5], [1][23][45], and [1][2][345];
Partitions having 4 segments: [12][3][4][5], [1][23][4][5], [1][2][34][5], and [1][2][3][45]; and
Partitions having 5 segments: [1][2][3][4][5]

The partition with the lowest AIC may be returned as the partitioning that best fits the data.

Calculating an AIC for a multinomial model having a sequence of multinomial observations $(x_1, \ldots, X_N)$ where each $x_i = (x_{i1}, \ldots, x_{iK})$ includes $n_i$ counts, $$\sum_{j=1}^{k} x_{ij} = n_i,$$

may be performed as follows. The complete model may allow for each multinomial observation to have its own set of K−1 parameters:

$$L_i(p_{i1}, \ldots, p_{iK}; x_{i1}, \ldots, x_{iK}) = \binom{n_i}{x_{i1}, \ldots, x_{iK}} p_{i1}^{x_{i1}} \cdots p_{iK}^{x_{iK}}$$

or the corresponding log likelihood:

$$l_i(p_{i1}, \ldots, p_{iK}; x_{i1}, \ldots, x_{iK}) =$$
$$\log\binom{n_i}{x_{i1}, \ldots, x_{iK}} + x_{i1}\log(p_{i1}) + \ldots + x_{iK}\log(p_{iK}).$$

The maximum likelihood estimators of the parameters may be $\hat{p}_{ij} = X_{ij}/n_i$. Accordingly, the saturated likelihood may have the value:

$$\sum_{i=1}^{N} l_i(p_{i1}, \ldots, p_{iK}; x_{i1}, \ldots, x_{iK}) =$$
$$\sum_{i=1}^{N} \log\binom{n_i}{x_{i1}, \ldots, x_{iK}} + x_{i1}\log(x_{i1}) + \ldots + x_{iK}\log(x_{iK}) - K\log(n_i).$$

The AIC of this model may then be calculated as:

$$AIC(p_{i1}, \ldots, p_{iK}; x_{i1}, \ldots, x_{iK}) =$$
$$-2\sum_{i=1}^{N} [l_i(\hat{p}_{i1}, \ldots, \hat{p}_{iK}; x_{i1}, \ldots, x_{iK}) + 2(K-1)].$$

In vector notation, the AIC may be represented as:

$$AIC(p_i; x_i) = -2\sum_{i=1}^{N} l(\hat{p}_i; x_i) + 2N(K-1).$$

The ordered partitions of the sequence may then be ranked according to the corresponding AICs (where the smallest AIC may represent the most desirable partition). For example, for a partition in which $p_{1j} = p_{2j} = p_{3j} = p_{123,j}$, the maximum likelihood estimator of this parameter may be represented as: $\hat{p}_{123,j} = (x_{1j} + x_{2j} + x_{3j})/(n_1 + n_2 + n_3)$, j=1, ..., K. If N=5 and the partition is [123][45], the log likelihood function at the maximum likelihood estimate and the AIC may be calculated as:

$$l[123][45] =$$
$$C + \sum_{j=1}^{K} \left[(x_{1j} + x_{2j} + x_{3j})\log\left(\frac{x_{1j} + x_{2j} + x_{3j}}{n_1 + n_2 + n_3}\right) + (x_{4j} + x_{5j})\log\left(\frac{x_{4j} + x_{5j}}{n_4 + n_5}\right)\right]$$

and $$AIC[123][45] = -2l[123][45] + 2(2)(K-1),$$

where the '2' in the parentheses of the AIC calculation may be included because the interval [12345] was partitioned into '2' intervals [123] and [45]. Simplifying the log likelihood function for this partition may result in the following:

$$l[123][45] =$$
$$C + \sum_{j=1}^{K} [(x_{1j} + x_{2j} + x_{3j})[\log(x_{1j} + x_{2j} + x_{3j}) - \log(n_1 + n_2 + n_3)] +$$
$$(x_{4j} + x_{5j})[\log(x_{4j} + x_{5j}) - \log(n_4 + n_5)]].$$

The partition having the smallest AIC may be the partition that best explains the data. For example, if partition [123][45] is the partition having the smallest AIC, the partition may be interpreted to mean that observations (vectors) 1, 2 and 3 share the same underlying distribution and observations 4 and 5 share the same underlying distribution. This may mean that the first three observations share the same topic (i.e., that the document collections are not statistically distinguishable). It may also be concluded that the last two observations share the same topic. Moreover, the distributions of observations 1, 2 and 3 may be determined to be different from the distributions of observations 4 and 5. If these observations represent document collections, it may be concluded that a topic change occurred between document collection 3 and document collection 4.

A cluster topic may then be determined 135 based on the clusters of document collections using any topic extraction algorithm.

The above-described embodiment examines $2_{N-1}$ partitions and thus requires $O(2^N)$ time to calculate the values of the partitions. In an alternate embodiment, the best AIC segmentation of a time series of independent observations may be calculated in $O(N^3)$ time, where N is the number of observations in the series.

Figure 1B:
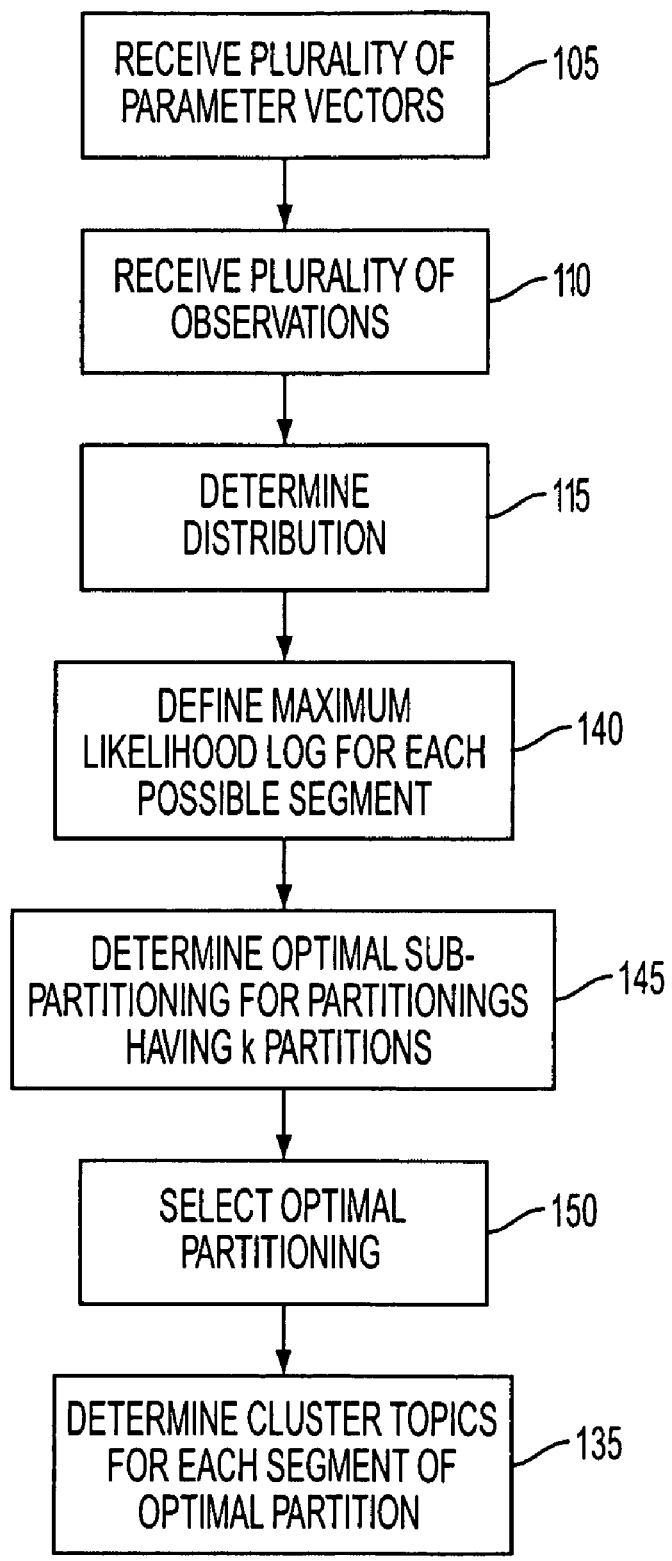

FIG. 1B depicts a flow diagram for a second exemplary process for determining document clusters according to an embodiment. Similar to FIG. 1A, a plurality of parameter vectors 105 and a plurality of observations 110 may each be obtained. Each parameter vector may include a plurality of parameters. In an embodiment, the observations may be received 110 in a time-ordered manner. Each observation may have been generated from, for example, a document cluster. A distribution may also be determined 115.

For ordered (usually multivariate) observations $x_1, \ldots, x_N$ of random variables with probability distribution functions $f(x; p_i)$, segmenting the series into homogeneous intervals may be performed by fitting a set of partitionings and choosing the partitioning having the lowest penalized likelihood function, such as the AIC. A likelihood function L (described above) may be generally defined for an ordered partition of the form $[1, \ldots, i_1][i_1+1, \ldots, i_2] \ldots [i_k+1, \ldots, N]$ as:

$$L(p_{[1,\ldots,i_1]}, p_{[i_1+1,\ldots,i_2]}, \ldots, p_{[i_k+1,\ldots,N]}; x_1, \ldots, x_N) = f(x_1; p_{[1,\ldots,i_1]}) \cdots f(x_{i_1}; p_{[1,\ldots,i_1]}) \cdots f(x_{i_k+1}; p_{[i_k+1,\ldots,N]}) \cdots f(x_N; p_{[i_k+1,\ldots,N]}).$$

The AIC of this partitioning may be calculated as:

$$AIC = -2 \log(L(p_{[1,\ldots,i_1]}, p_{[i_1+1,\ldots,i_2]}, \ldots, p_{[i_k1,\ldots,N]})) + 2(k+1)|p|,$$

where there are k+1 segments in the partitioning above and |p| parameters in $f(x; p_i)$.

A function $$T[0; i, j] = \max_{p_{[i,\ldots,j]}} \sum_{m=i}^{j} \log(f(x_m; p_{[i,\ldots,j]}))$$

may be defined 140 for $1 \leq i \leq j \leq N$ to store the maximum likelihood log for each possible segment. After initializing T, the best AIC may be calculated 145 for each partitioning having k partitions. S[k; i, j].list may be used to store the left-hand endpoints of each segment in the best partitioning with k partitions. A method for determining the best partitioning may then be performed 145 using, for example, the following algorithm:

```
AIC[0] = -2T[0; 1, N] + 2|p|
for k = 1 to N - 1
  begin
    for j = k + 1 to N
      begin
        for i = 1 to j - k
          begin
            S[0; i, j].list = i
            î = max    T[0; i, l] + T[k - 1; l + 1, j]
                i≤l≤j-k
            T[k; i, j] = T[0; i, î] + T[k - 1; î + 1, j]
            S[k; i, j].list = concatenate(S[0; i, î].list, S[k - 1; î + 1, j].list)
          end i
      end j
    AIC[k] = -2T[k; 1, N] + 2(k + 1)|p|
  end k
```

The number of segments for the optimal partition may be calculated as:

$$M = 1 + \operatorname*{argmin}_{1 \leq k \leq N-1} AIC[k]$$

and the best partition may be represented 150 as S[M−1; 1, N].list. A cluster topic may then be determined 135 based on the clusters of document collections using a topic extraction algorithm.

An exemplary application of the above-described methods was performed with respect to a sequence of customer service logs. In the example, each customer service log pertained to a one-month period of time, and the service logs were grouped in a time-ordered fashion. In the example, the particular logs were {February 2004, March 2004, April 2004, May 2004, June 2004, July 2004, August 2004, September 2004, October 2004, November 2004, December 2004, January 2005}. Each service log was modeled as a term-frequency vector in which the number of occurrences of each term was tallied.

The first-described AIC-ranking method was applied and resulted in the following clusters: {February 2004, March 2004, April 2004, May 2004}, {June 2004, July 2004}, {August 2004}, {September 2004, October 2004}, and {November 2004, December 2004, January 2005}. In order to determine whether the collection was appropriately defined, a list of the most common terms for each cluster was examined. The most probable terms for each cluster were as follows:

February 2004-May 2004: {delete, dfe, jam, end, tracking, advised, cdrom, action, diagnostics};

June 2004-July 2004: {jul, duplex, long, feed, sided, default, ftp, controller, trays, upgraded};

August 2004: {aug, upgraded, digipath, development, start, unassigned, currently, onsite, sets, cc};

September 2004-October 2004: {rotation, dhl, onsite, business, ll, controller, po, sep, cc, successful}; and November 2004-January 2005: {jan, client, implemented, dec, nov, start, shift, option, board, recreate}.

Many of the month abbreviations (italicized) were included in the proper cluster (i.e., the cluster including the month pertaining to the abbreviation), indicating that the clustering is interpretable. Moreover, removing the month terms did not change the clusters. This indicates that, in this example, a single or a few terms did not dominate the clustering.

Figure 2:
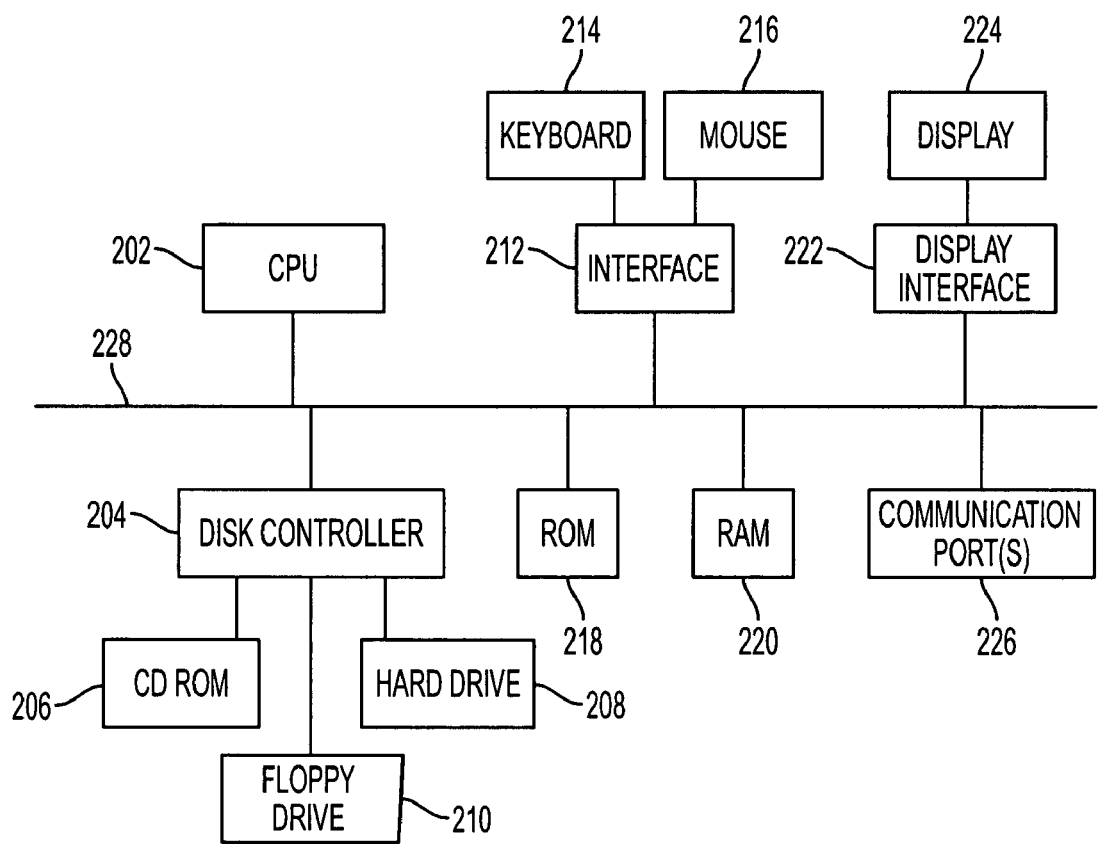
FIG. 2 depicts a block diagram of exemplary hardware that contains or implements program instructions according to an embodiment.

FIG. 2 is a block diagram of exemplary internal hardware that may be used to contain or implement the program instructions according to an embodiment. Referring to FIG. 2, a bus 228 may serve as a main information highway interconnecting the other illustrated components of the hardware. CPU 202 is the central processing unit of the system, performing calculations and logic operations required to execute a program. Read only memory (ROM) 218 and random access memory (RAM) 220 constitute exemplary memory devices.

A disk controller 204 interfaces with one or more optional disk drives to the system bus 228. These disk drives may be external or internal floppy disk drives such as 210, CD ROM drives 206, or external or internal hard drives 208. As indicated previously, these various disk drives and disk controllers are optional devices.

Program instructions may be stored in the ROM 218 and/or the RAM 220. Optionally, program instructions may be stored on a processor-readable medium or carrier such as a floppy disk or a digital disk or other recording medium, a communications signal or a carrier wave.

An optional display interface 222 may permit information from the bus 228 to be displayed on the display 224 in audio, graphic or alphanumeric format. Communication with external devices may optionally occur using various communication ports 226. An exemplary communication port 226 may be attached to a communications network, such as the Internet or an intranet.

In addition to computer-type components and their equivalents, the hardware may also include an interface 212 which allows for receipt of data from input devices such as a keyboard 214 or other input device 216 such as a remote control, pointer and/or joystick.

A multiprocessor system may optionally be used to perform one, some or all of the operations described herein. Likewise, an embedded system may optionally be used to perform one, some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for clustering document collection observations, the system comprising:
   a processor; and
   a processor-readable storage medium in communication with the processor, wherein the processor-readable storage medium contains one or more programming instructions for:
      receiving a plurality of parameter vectors,
      determining a distribution,
      receiving a plurality of observations, wherein each observation corresponds to a document collection,
      selecting an optimal partitioning of the observations based on the distribution, the parameter vectors, and a likelihood function, and
      determining a cluster of observations based on the optimal partitioning.

2. The system of claim 1 wherein selecting an optimal partitioning comprises one or more programming instructions for performing the following:
   for each possible partitioning of the observations, wherein each partitioning comprises one or more segments, wherein each segment comprises one or more observations:
      determining a maximum likelihood parameter vector for each segment, wherein the maximum likelihood parameter vector comprises the parameter vector that maximizes the product of the distributions for each observation in the segment, and
      calculating a penalized likelihood value using the likelihood function based on at least a plurality of likelihoods, wherein each likelihood comprises the distribution for each observation with respect to the maximum likelihood parameter vector for the segment containing the observation; and
   selecting an optimal partitioning, wherein the optimal partitioning comprises the partitioning having the smallest penalized likelihood value.

3. The system of claim 2 wherein the processor-readable storage medium further contains one or more programming instructions for determining a cluster topic for each segment of the optimal partitioning.

4. The system of claim 1 wherein selecting an optimal partitioning comprises one or more programming instructions for performing the following:
   for each possible segment of one or more observations, determining a maximum log likelihood value for the segment, wherein the maximum log likelihood value comprises the largest sum of the logarithms of a distribution for each observation in the segment;
   for each possible number of segments, wherein the possible number of segments may range from one to the number of observations, inclusive,
      determining an optimal sub-partitioning from one or more partitionings having the number of segments, wherein the optimal sub-partitioning comprises the partitioning having a largest value for a sum of one or more log likelihood values, wherein each log likelihood value comprises the logarithm of the distribution of an observation with respect to a parameter vector for the segment containing the observation, and
      calculating a penalized likelihood value using the likelihood function for the optimal sub-partitioning having the number of segments; and
   selecting an optimal partitioning, wherein the optimal partitioning comprises the optimal sub-partitioning having the smallest penalized likelihood value.

5. The system of claim 4 wherein the processor-readable storage medium further contains one or more programming instructions for determining a cluster topic for each segment of the optimal partitioning.

6. The system of claim 1 wherein the likelihood function comprises the Akaike's Information Criterion.

7. The system of claim 1 wherein the plurality of observations are time-ordered.

8. The system of claim 1 wherein the distribution comprises one or more of the following: a multinomial distribution; and a Bernoulli distribution.

9. A method of clustering observations, the method comprising:
   receiving a plurality of parameter vectors;
   determining a distribution;
   receiving a plurality of observations, wherein each observation corresponds to a customer service log, wherein the plurality of observations are time-ordered;
   selecting, by a processor, an optimal partitioning of the observations based on the distribution, the parameter vectors, and a likelihood function; and
   determining a cluster of observations based on the optimal partitioning.

10. The method of claim 9 wherein selecting an optimal partitioning comprises:
    for each possible partitioning of the observations, wherein each partitioning comprises one or more segments, wherein each segment comprises one or more observations:
       determining a maximum likelihood parameter vector for each segment, wherein the maximum likelihood parameter vector comprises the parameter vector that maximizes the product of the distributions for each observation in the segment, and
       calculating a penalized likelihood value using the likelihood function based on at least a plurality of likelihoods, wherein each likelihood comprises the distribution for each observation with respect to the maximum likelihood parameter vector for the segment containing the observation; and selecting an optimal partitioning, wherein the optimal partitioning comprises the partitioning having the smallest penalized likelihood value.

11. The method of claim 10, further comprising: determining a cluster topic for each segment of the optimal partitioning.

12. The method of claim 9 wherein selecting an optimal partitioning comprises:

for each possible segment of one or more observations, determining a maximum log likelihood value for the segment, wherein the maximum log likelihood value comprises the largest sum of the logarithms of a distribution for each observation in the segment;

for each possible number of segments, wherein the possible number of segments may range from one to the number of observations, inclusive, determining an optimal sub-partitioning from one or more partitionings having the number of segments, wherein the optimal sub-partitioning comprises the partitioning having a largest value for a sum of one or more log likelihood values, wherein each log likelihood value comprises the logarithm of the distribution of an observation with respect to a parameter vector for the segment containing the observation, and calculating a penalized likelihood value using the likelihood function for the optimal sub-partitioning having the number of segments; and selecting an optimal partitioning, wherein the optimal partitioning comprises the optimal sub-partitioning having the smallest penalized likelihood value.

13. The method of claim 12, further comprising: determining a cluster topic for each segment of the optimal partitioning.

14. The method of claim 9 wherein the likelihood function value comprises a value determined using the Akaike's Information Criterion.

15. The method of claim 9 wherein the distribution comprises one or more of the following: a multinomial distribution; and a Bernoulli distribution.

16. The method of claim 9 wherein the plurality of parameter vectors are received from a processor-readable carrier.

17. The method of claim 9 wherein the plurality of observations are received from a processor-readable carrier.

18. The method of claim 9 wherein the distribution is determined using at least one processor.

* * * * *